United States Patent [19]

Cromer et al.

[11] 4,029,856

[45] June 14, 1977

[54] SINTERED POROUS PLAQUE BATTERY PLATES AND METHOD OF MAKING SAME

[75] Inventors: George Phillip Cromer; Harry Harold Hazen, both of Keystone Heights; Saverio Pensabene, Gainesville, all of Fla.

[73] Assignee: General Electric Company, Columbus, Ohio

[22] Filed: Apr. 30, 1976

[21] Appl. No.: 681,973

[52] U.S. Cl. .................................. 429/94; 141/1.1; 29/623.5

[51] Int. Cl.² ......................................... H01M 6/10

[58] Field of Search ................ 429/94, 178; 141/1, 141/1.1; 29/623.5

[56] References Cited

UNITED STATES PATENTS

| | | | |
|---|---|---|---|
| 3,695,935 | 10/1972 | Cromer | 429/94 |
| 3,790,408 | 2/1974 | Cromer | 429/94 |

Primary Examiner—Anthony Skapars

Attorney, Agent, or Firm—D. A. Dearing; D. J. Voss; F. L. Neuhauser

[57] ABSTRACT

A sintered porous plaque battery plate comprises an elongated substrate and a sintered porous plaque on both major surfaces thereof. One longitudinal edge of the substrate has a region substantially free of porous plaque for welding a current collector thereto and the other opposed longitudinal edge of the substrate has a transversely tapered porous plaque region on both major surfaces of the plate adjacent and extending longitudinally of the opposed edge for preventing the plaque from chipping along the opposed edge. The method for forming such plates includes the steps of (1) coating a substrate with double and single plate width strips of powdered metal slurry, (2) forming a V-shaped groove longitudinally of each of said double width strips to define a tapered porous plaque region along one edge of each plate, and (3) severing the substrate into strips of plate each with a tapered edge region after the slurry has been sintered into a porous plate.

19 Claims, 8 Drawing Figures

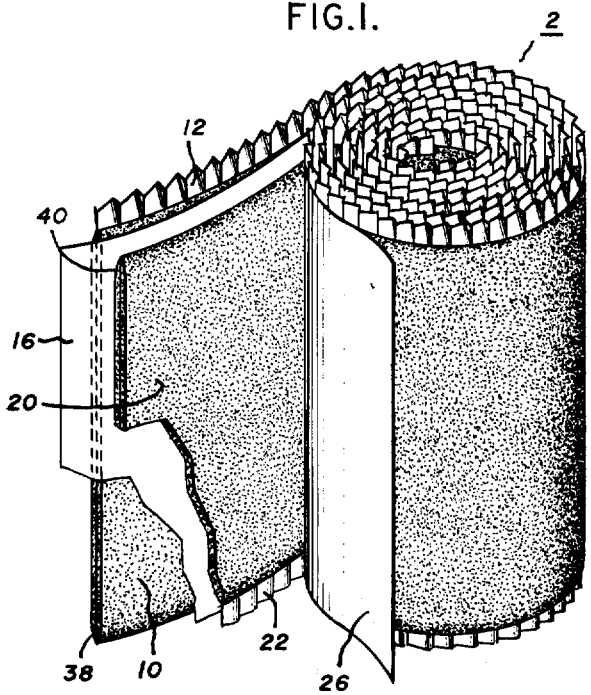
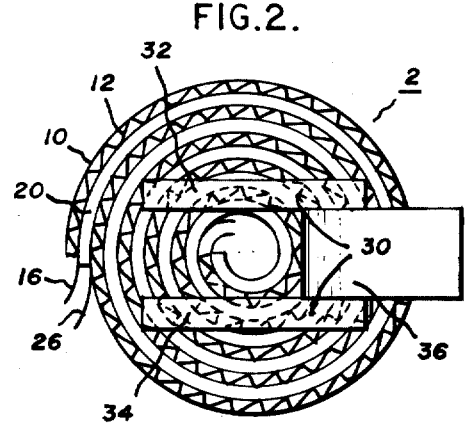
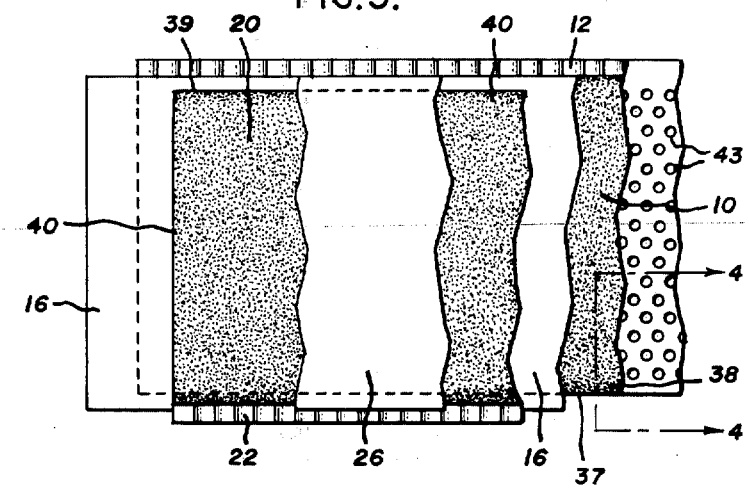

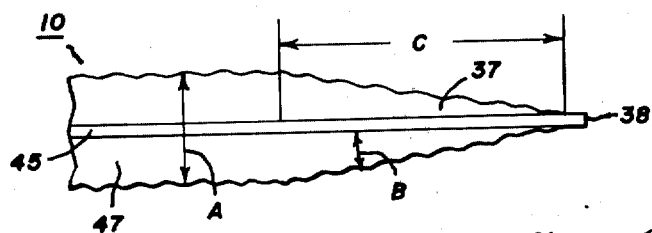
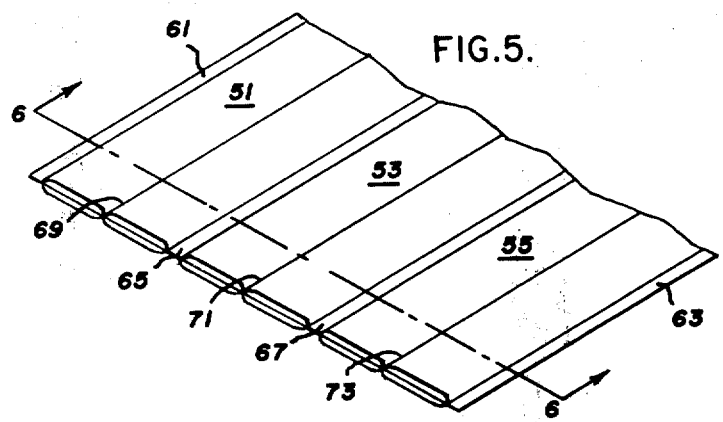
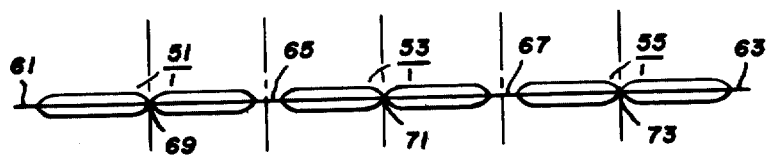
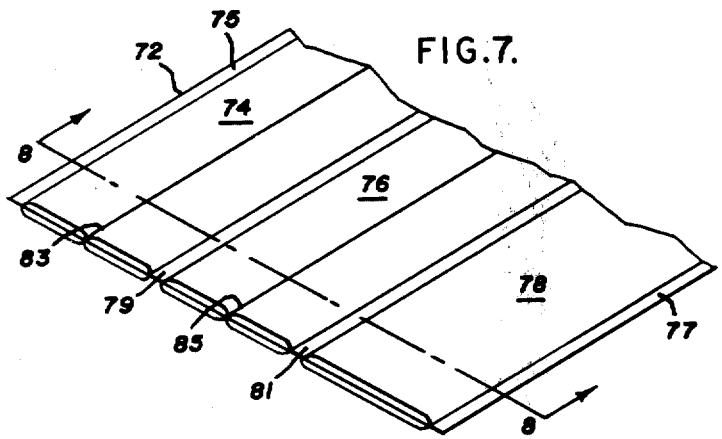
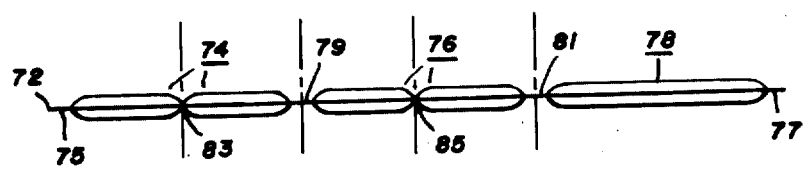

SINTERED POROUS PLAQUE BATTERY PLATES AND METHOD OF MAKING SAME

BACKGROUND OF THE INVENTION

This invention relates to battery plates and method for making same and, more particularly, to rechargeable battery plates in which the active material is impregnated in a sintered porous plaque.

In U.S. Pat. No. 3,790,408 assigned to the assignee of this invention, there is described a battery coil in which one of the longitudinal edges of the negative plate is extended transversely beyond one longitudinal edge of the positive plate at one end of the coil and the other longitudinal edge of the positive plate is extended beyond the other longitudinal edge of the negative plate at the opposite end of the coil. This construction permits the easy attachment of positive and negative plate current collectors to the extended edges of the respective plates by welding of the current collectors to the extended edges at a plurality of contact points. The plates are comprised of a thin metal substrate with a sintered porous plaque coating both major surfaces of the substrate. The active material of the battery is impregnated in the pores of the porous plaque. A small region adjacent one longitudinal edge of each plate which forms the extended edge is free of the porous plaque and active material for, among other reasons, assuring the formation of a good weld between the plate edge and the current collector. At the opposite longitudinal edge of each plate, the porous plaque extends to the substrate edge and terminates in a flat edge coplanar with the substrate edge (hereinafter referred to as "flat edge termination"). The principal reasons for flat edge termination is that it is important to maximize the volume of porous plaque per unit cell volume in order to maximize the energy density of the cell. This is particularly important in small rechargeable cells such as nickel-cadmium.

In the method for making such plates, an elongated metal substrate is used which has a width dimension such that a plurality of strips of plates can be formed by longitudinally severing the substrate into a plurality of strips. The substrate is coated on both major surfaces with a slurry comprised of a metal powder. The slurry coating is then divided into continuous strips by forming longitudinally slurry-free channels by using doctor blades to wipe the channels free of slurry. Also, a region adjacent each edge of the substrate is wiped free of slurry. The edge regions of the substrate eventually form the extended edge of each plate which is to be formed adjacent thereto Each continuous strip of slurry is dimensioned to be approximately equal either to the sume of the widths of two battery plates or to the width of a single battery plate (hereinafter referred to as "double width" and "single width" strips). For example, when using a substrate of 20.32 cm width, three double width strips of slurry are defined by two channels by running longitudinally of the substrate. The double width strips eventually form plates of 3.2 cm width used in a sub-C cell. A variation to accommodate plates of other widths is to form, on a substrate of 18.0 cm width, one double width strip and one songle width strip. The double width and single width strips are used to form plates of 4.7 cm used in D cell. Other variations are also possible. After the slurry strips are formed, the substrate is passed through a sintering furnace in which the slurry is transformed into a porous plaque. The porous plaque coated substrate is then severed into strips of plate of the finished width. The strips of plate cut from the double width strips have a slurry-free edge region along one longitudinal edge which is formed the slurry-free channel or edge region of the substrate and the opposing longitudinal edge of the plate strip has a flat edge termination. Similarly, the sngle width strips are cut so that one longitudinal edge has a slurry-free edge region formed by the slurry-free edge of the substrate and the opposing longitudinal edge has a flat edge termination. The strips are then impregnated with active material and transversely severed into a plurality of plates.

While this construction has been found to be generally advantageous, it has been noted that there is a tendency for the cells to become shorted during cell assembly and testing. Cell shorting is also one of the major problems which will cut short the expected life of such cells.

Accordingly, it is an object of this invention to provide an improved porous plaque plate construction which is less subject to shorting during assembly into battery coils and during their subsequent use as cells.

Another object of the invention is to provide a porous plaque battery plate which is less subject to flaking and chipping of the porous plaque during assembly.

SUMMARY OF THE INVENTION

These and other objects, which will be apparent from a consideration from the following detail description of the invention and accompanying claims, are accomplished by a battery plate construction which is comprised of an elongated substrate with a sintered porous plaque coated on both major surfaces of the substrate. One longitudinal edge of the substrate has a region substantially free of porous plaque and the other opposed longitudinal edge of the substrate has a transversely tapered porous plaque region on both major surfaces of the substrate adjacent and extending longitudinally of the opposed edge for preventing the flaking and crumbling of the plaque from the edge of the substrate. Such a battery plate is used to form at least one plate of the battery coil in which the plates are transversely offset from each other to provide an extended edge of one plate at one end of the coil and extended edge of the other plate at the other end of the coil. The longitudinal edge of the plate which has a region substantially free of porous plaque is used to form the extended edge. Current collectors are welded to the extended edges at each end of the coil.

The method for forming such plates includes the steps of providing a substrate with double width and/or single width strips of powdered metal slurry, forming a V-shaped groove longitudinally of said double width strip to define a tapered porous plaque region for one edge of each of the two strips of plates to be formed from the double width strip and severing the substrate into a plurality of plate strips each with a tapered porous plaque region after the slurry has been sintered into a porous plaque.

Adjacent is used herein to define the relationship of two objects which are near or close to each other. The objects may or may not be in actual contact. See *Webster's New World Dictionary*, Second College Edition.

BRIEF DESCRIPTION OF DRAWINGS

FIG. 1 is a perspective view, partially broken away, of a battery coil in accordance with the feature of this invention.

FIG. 2 is a plan view of the battery coil of FIG. 1 showing a current collector attached to the end of the coil.

FIG. 3 is an elevational view, partially broken away, of a portion of FIG. 1.

FIG. 4 is a cross-sectional view of FIG. 3 taken along Line 4—4 of FIG. 3.

FIG. 5 is a perspective view of a substrate with one arrangement of slurry coatings which view represents the plates at one stage in the method for constructing same in accordance with this invention.

FIG. 6 is a cross-sectional view of the slurry coated substrate of FIG. 5 taken along Line 6—6 of FIG. 5.

FIG. 7 is a perspective view of a substrate with a second arrangement of slurry coatings which view represents the plates at one stage in the method for constructing same in accordance with this invention.

FIG. 8 is a cross-sectional view of the slurry coated substrate of FIG. 7 taken along Line 8—8 of FIG. 7.

DESCRIPTION OF THE PREFERRED EMBODIMENTS

Referring now to the drawings and particularly to FIG. 1, there is shown a battery coil 2 which comprises a positive plate 10, a first separator 15, a negative plate 20, and a second separate 26.

Plates 10, 20 with separators 16, 26 therebetween, are spirally wound to form coil 2. Plate 10, 20 are transversely offset from one another as well as separators 16, 26, to provide an extended longitudinal edge 12 of plate 10 at one end of coil 2 and an extended edge 22 of plate 20 at the opposite end of coil 2.

As described in the aforementioned patent U.S. Pat. No. 3,790,408, which is hereby incorporated by reference herein, edges 12 and 22, respectively of plate 10, 20 are formed with a ruffled or nonlinear configuration as best seen in FIGS. 1 and 3. This configuration (FIG. 2) is used to impart strength and also provides a larger cross section of the exposed edge available for welding to current collector 30 provided at one end of coil 2. A second current collector is provided at the lower end of coil 2 (FIG. 2) but illustration thereof is omitted because it is identical to collector 30. Current collector 30 may comprise, for example two substantially planar leg portions 32, 34 and a raised central portion 36. The raised central portion 36 is subsequently welded to the base of a cover disc for the cell can which forms the positive terminal of the cell can. The central portion of the negative current collector (not shown) is welded to the base of the cell can which forms the negative terminal of the cell. The attachment of the current collectors to the terminals of the cell forms no part of the present invention and is therefore not shown.

Leg portions 32, 34 may also have downturned knife edges which are imbedded in and welded to extended edge 12 thereby to provide good electrical contact between plate 10 and current collector 30.

In accordance with the features of this invention, longitudinal edges 38, 40 of plates 10, 20 are provided with a transversely tapered porous plaque region 37 on both major surfaces of the plates adjacent and extending longitudinally of the plates. This configuration is used to impart structural integrity to the porous plaque at the edge. In the prior art design described hereinabove, the porous plaque in this region could easily chip and flake during handling and assembly of the plates into a battery coil and a completed cell.

In FIG. 4 and exemplary and preferred embodiment of the components of plate 10 and region 37 thereof are shown. Plate 10 comprises a metal substrate 45 of nickel-plated steel with an array of perforations 43 therethrough and a porous plaque coating 47 of sintered nickel powder on both major surfaces of the substrate. The construction of the negative plate 20 is the same of the same of positive plate 10 except that, of course, positive active material is impregnated into plaque 45 of plate 10 and negative active material is impregnated into the plaque of the negative plate 20.

In a preferred embodiment of plate 10 the plate thickness A is generally between 0.3 and 1.0 mm. The tapering angle B of region 37 is generally between 5° and 30°. Tapered length C is between 2 and 4 mm. As will be recognized, these dimensions are intended to be exemplary only and are not necessarily critical to the invention. The critical dimensional aspect of region 37 is that it be gradually tapered to terminate adjacent to edge 38 thereby to impart structural integrity to the plaque in this region. Plaque 47 is preferably terminated contiguous with edge 38. Of course, plaque 47 can be terminated short of edge 38, but this is not desirable because this reduces the pore volume of the plaque which is available for impregnation of active material. Also, it will recognize that taper angle α should be as steep as possible to maximize pore volume.

As a comparision of the available pore volume of the plates constructed in accordance with the invention and prior art plates with a flat edge termination, there is a theoretical loss of about 4% of pore volume caused by the practice of this invention based on plate dimensions given in the Table below.

TABLE

|  | Prior Art | Invention |
|---|---|---|
| Plate length (cm.) | 15.748 | 15.748 |
| Plate thickness (mm) | 0.65 | 0.65 |
| Substrate thickness (mm) | 0.063 | 0.063 |
| Tapering angle | 90° | 15° |
| Plaque porosity (%) | .83 | .83 |
| Pore volume (cm³) | 2.3 | 2.2 |

In brief, the method for making battery plates in accordance with this invention comprises the steps of:

A. Providing an elongated metal substrate;

B. Applying a slurry comprised of a metal powder to the major surfaces of the substrate;

C. Forming channels in said slurry to define a plurality of continuous longitudinal double and/or single width strips of said slurry;

D. Forming in the double width slurry strips a narrow groove longitudinally of said double width strip to define one edge of each plate strip to be formed therefrom;

E. Passing said slurry-coated substrate into a sintering furnace and sintering the slurry into a rigid porous plaque;

F. Severing said substrate along the edge regions, grooves and channels to form strips of plates from the substrate;

G. Impregnating the porous plaques with active material; and

H. Severing each of said strips of plates transversely into predetermined lengths thereby to form a plurality of plates from each of said strips.

The substrate used in the practice of the method of the invention is preferably a nickel-plated steel substrate, although other types are acceptable, and has an array of performations in the areas which are to be covered with plaque in the finished plate. The substrate is wide enough to accommodate a plurality of strips of battery plate being formed therefrom. For example, with 3.25 cm. wide battery plate, six strips of battery plate can be formed from the 20.3 cm. wide substrate. (See FIGS. 5 and 6 discussed hereinbelow.) In an alternative arrangement four strips of 3.33 cm. wide battery plate and one strip of 3.33 cm. wide battery plate are formed on the substrate for a total of five strips of battery plate. (See FIGS. 7 and 8 discussed hereinbelow.) Other arrangements for plates of other widths will be apparent to those skilled in the art.

The substrate is coated on both major surfaces thereof with a slurry comprised of a nickel metal powder in a viscous gel carrier. The slurry can be applied by any conventional method such as, for example, calendaring.

After the slurry has been applied to both major surfaces of the substrate in a continuous substantially uniform coating, the substrate is moved through a doctor blade station in which the slurry coating on the substrate is divided by doctor blades into a plurality of slurry strips running longitudinally of the substrate.

Reference is made to FIGS. 5, 6 and 7 which show exemplary alternative arrangements of slurry strips on the substrate. FIGS. 5 and 6 show the six plate strip arrangement and FIG. 7 shows the five plate strip arrangement, both discussed above.

In FIG. 5, three double width slurry strips 51, 53, 55 are defined by slurry-free edge regions 61 and 63 and slurry-free regions or channels 65 and 67, strip 51 being between edge region 61 and channel 65, strip 53 being between channels 65 and 67 and strip 55 being between channel 67 and edge region 63. Each double width strip 51, 53, 55 is divided in half by formation of V-shaped grooves 69, 71, 73, respectively. The slurry-free edge regions 61, 63; channels 65, 67; and grooves 69, 71, 73 are preferably formed by the use of doctor blades of the appropriate width simultaneously at one doctor blade station. However, they could obviously be formed at separate stations if desired.

For example in the embodiment shown in FIGS. 5, 6, the blades (not shown) can be rectangular parallel-piped bars which are 0.1 cm. wide for forming the groove and 0.3 cm. wide for forming the channels. The ends of the bar-shaped blades which contact the substrate need not be especialy shaped because of the inherent tendancy of the sides of the blade which are positioned perpendicular to the substrate surface to form a tapered porous plaque region on each side of the grooves and channels being formed.

In FIGS. 7 and 8 two double width strips 74, 76 and one single width strip 78 are defined on substrate 72 by slurry-free edge regions 75, 77 and slurry-free regions or channels 79, 81. Each double width strips 74, 76 is divided in half by formation of "V" grooves 83, 85, respectively. The edge regions 75, 77; channels 79, 81; and grooves 83, 85 are formed as explained in connection with FIG. 5.

After the appropriately arranged slurry-free edge regions, channels and grooves have been formed on the substrate to define slurry coated strips of the desired width, the substrate is then passed through a sintering furnace which transforms the slurry into a sintered porous plaque of nickel powder.

At a slitting station (not shown), the substrate is then simultaneously cut into strips of plate of the appropriate widths by severing along the edge regions, channels and grooves.

The plate strips are cut from substrate 62 (FIG. 5) by cutting along the vertex of the grooves 69, 71, 73, in edge regions 61, 63 and midway of each channel 65, 67. Channels 65, 67 are sized such that after severing each one-half of each channel forms the slurry-free edge region of the adjacent plate strip. The opposite longitudinal edge of each plate strip has a tapered porous plaque region adjacent the edge formed by one side of the groove.

When cutting the strips of plate from the embodiment of FIG. 7 which contains a single width strip 78, the cut for strip 78 is made in channel 81 along a line where the plaque terminates such that the strip of plate 78 has a longitudinal edge with a tapered porous plaque region adjacent the substrate edge such as shown in FIG. 4. The opposite longitudinal edge of strip 78 is cut so as to have a slurry-free edge region of the desired width which becomes the extended edge of the plate in a cell coil.

The portion of channel 81 remaining after severing strip 78 therefrom forms the slurry-free edge edge of the adjacent plate strip cut from double width strip 76.

Channel 79 is sized, in a similar manner to channels 65, 67 (FIG. 5), such that it is cut in half, one-half forming the slurry-free edge region of the adjacent plate strip cut from double width strip 76 and the second one-half forms the slurry-free edge region of the adjacent plate strip cut from double width strip 74.

In accordance with this invention severing can be accomplished in a number of ways, by using a rotating of fixed cutter or by using a blanking punch and die.

The strip of plates are then impregnated, in a conventional manner, by repeatedly (1) immersing of the strips into a bath of a salt of the active material, (2) removing the plate from the salt bath, (3) drying the plate, (4) immersing the plate into a solution for precipitating the active material in the form of an hydroxide, and (5) removing the plate from the solution and drying-until the plates have the desired capacity. Typically, the process must be repeated approximately six times to impregnate enough active material to reach the desired capacity.

Each impregnated strip of plate is then severed transversely of its length into sections of the appropriate length. At this point, the plates have been sized to their finished dimensions.

The plates, one negative and one positive, with separator material are then spirally wound into a battery coil as shown in FIGS. 1, 2 and 3. While a battery coil may contain two plates constructed into accordance with the features of this invention, cells may also be constructed with only the positive plate so constructed and the remaining negative plate is a pasted plate which is constructed with the teaching of U.S. Pat. No. 3,877,986 and 3,870,562 which are hereby incorporated by reference herein.

To better illustrate the effectiveness of this invention to provide an improved construction and to prevent shorting, the following tests were conducted.

Approximately 188,000 "prior art" NiCd cells were constructed identically to 7,400 NiCd cells constructed according to features of this invention with the exception that in the prior art cells (e.g., as shown by FIG. 5) grooves 69, 71, and 73 were not formed in the substrate prior to sintering. When plates were cut from the substrate after sintering, the strips of plate were formed with a flat edge termination along one longitudinal edge of each plate by severing midway between edge 61 and channel 65. It was found that by testing the prior art cells and the cells of this invention at various points during the assembly procedure that 17.1% of the prior art cells and 6.7% of the cells of this invention were rejected because of shorts. Accordingly, it is concluded that practice of this invention results in a superior battery plate which upon being spirally would into a battery coil provides a design which is less subject to shorting during assembly into a completed cell.

While the invention has been described in accordance with certain preferred embodiments thereof, other modifications will be apparent to those skilled in the art. Accordingly, it is intended that the invention be interpreted to include such modifications which are embraced within the following claims.

We claim:

1. A method for making battery plates comprising the steps of:
   a. providing an elongated metal substrate having a width dimensioned to form at least two longitudinal strips of plates from said substrate;
   b. forming a first continuous longitudinal strip of a slurry, comprised of a metal powder, said slurry strip being formed with a transversely tapered porous plaque region extending longitudinally of said slurry strip, the longitudinal edges of said slurry strip being defined by said tapered plaque region and a slurry-free region extending longitudinally of said substrate, respectively;
   c. sintering said slurry into a rigid porous plaque;
   d. severing said substrate longitudinally along said tapered porous plaque region so that said tapered region terminates adjacent the edge of the substrate formed by said severence; and
   e. severing said strip transversely into predetermined lengths thereby forming a plurality of plates from said strip.

2. The method of claim 1 wherein said slurry strip is a single width strip.

3. The method of claim 1 wherein said slurry strip is a double width strip.

4. The method of claim 1 further comprising the steps of:
   f. forming a continuous double width longitudinal strip of said slurry, said double width slurry strip defined on each side by slurry-free regions extending longitudinally of the substrate;
   g. forming a narrow groove longitudinally of said slurry strip to define one edge of each of said strip of plates; and
   h. severing said substrate along said groove after sintering said slurry of plates, each strip having a tapered porous plaque region adjacent the edge of the substrate formed by said severance along said groove.

5. The method of claim 1 wherein said first slurry strip is a single width strip.

6. The method of claim 1 further comprising positioning one of said plurality of plates and another plate with a separator sandwiched there between, such that said plates are transversely offset with the edges of said one plate formed by the slurry-free region and by said groove in a nonoverlapping and overlapping relationship, respectively, relative to said another plate; winding said one plate and said another plate, and said separator into a cell coil, the channel formed edge of said one plate defining a plane; and welding a current collector comprised of a planar surface and a downturned edge to said channel formed edge.

7. The method of claim 1 wherein said current collector is a percussion welded to said channel formed edge.

8. The method of claim 1 wherein said groove is V-shaped.

9. A method for making battery plates comprising the steps of:
   a. providing an elongated metal substrate having a width dimensioned to form at least two longitudinal strips of plates from said substrate;
   b. applying a slurry comprised of a metal powder to the major surfaces of said substrate;
   c. forming a continuous longitudinal strip of said slurry substantial equal in width to the combined width of two strips of plates, said slurry strip defined by each side by substantially slurry-free longitudinal region on substrate surface;
   d. forming a narrow groove longitudinally of said slurry strip to define one edge of each of said strip of plates;
   e. sintering said slurry into a rigid porous plaque;
   f. severing said substrate along said groove for forming two strips of plates;
   g. severing each of said strips traversely into predetermined lengths thereby forming a plurality of plates from each of said strips.

10. The method of claim 9 further comprising positioning one of said plurality of plates and another plate with a separator sandwiched therebetween, such that said plates are transversely offset with the edges of said one plate formed by the slurry-free region and by saig groove in a nonoverlapping and overlapping relationship, respectively, relative to said another plate; winding said one plate, said another plate, and said separator into a cell coil, the channel formed edge of said one plate defining a plane; and welding a current collector comprised of a planar surface and a downturned edge to said channel formed edge.

11. The method of claim 10 wherein said current collector is percussion welded to said channel formed edge.

12. The method of claim 9 wherein said groove is V-shaped.

13. In a battery coil comprising:
   a. a pair of partially overlapping spirally wound elongated plates, one of said plates transversely offset from the other of said plates to define a first extended edge of said one plate at one coil end and a second extended edge of said other plate at the other coil end, at least one plate of said pair having a sintered porous plaque on the opposed major surfaces thereof and with active material impregnated therein;
   b. a separator sandwiched between said pair of plates; and
   c. a current collector fixed to said first extended edge;
   d. the improvement comprising a transversely tapered porous plaque region on said major surfaces adjacent and extending longitudinally of the edge opposite said first extended edge of said one plate.

14. The coil of claim 13 further comprising a current collector fixed to the other of said first and second extended edges.

15. The coil of claim 14 wherein said current collectors comprise a substantially planar central portion and downturned edges embedded, respectively, in said first and second extended edges.

16. The coil of claim 16 wherein said first and second extended edges are substantially free of porous plaque and active material.

17. The coil of claim 13 the improvement further comprising a laterally tapered porous plaque region adjacent and extending longitudinally of the edge of said other plate opposite said second extended edge.

18. The coil of claim 13 wherein the other of said pair of plates is a pasted plate.

19. The coil of claim 13 wherein the angle of taper of said tapered porous plaque region is about 5° to 30°.

* * * * *